US008156085B2

(12) United States Patent
Dominguez, Jr. et al.

(10) Patent No.: US 8,156,085 B2
(45) Date of Patent: Apr. 10, 2012

(54) JAVA OBJECT CACHE SERVER FOR DATABASES

(75) Inventors: Frank Dominguez, Jr., Redwood City, CA (US); Dave Moellenhoff, Orinda, CA (US); Eric Chan, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 53 days.

(21) Appl. No.: 11/694,850

(22) Filed: Mar. 30, 2007

(65) Prior Publication Data

US 2007/0288510 A1 Dec. 13, 2007

Related U.S. Application Data

(63) Continuation of application No. 10/418,961, filed on Apr. 17, 2003, now Pat. No. 7,209,929.

(51) Int. Cl.
*G06F 17/30* (2006.01)
(52) U.S. Cl. ....................................................... 707/689
(58) Field of Classification Search ........................ None
See application file for complete search history.

(56) References Cited

U.S. PATENT DOCUMENTS

| | | | |
|---|---|---|---|
| 6,125,391 A | 9/2000 | Meltzer et al. | |
| 6,128,701 A | 10/2000 | Malcolm et al. | |
| 6,598,058 B2 | 7/2003 | Bird et al. | |
| 6,697,849 B1 * | 2/2004 | Carlson | 709/219 |
| 6,757,708 B1 * | 6/2004 | Craig et al. | 709/203 |
| 7,249,195 B2 | 7/2007 | Panec et al. | |
| 7,296,022 B2 | 11/2007 | Harjanto | |
| 7,376,790 B2 | 5/2008 | Lango et al. | |
| 7,480,657 B1 | 1/2009 | Glovin et al. | |
| 2002/0092012 A1 * | 7/2002 | Shah | 717/170 |
| 2004/0093515 A1 * | 5/2004 | Reeves, Jr. | 713/201 |
| 2005/0165828 A1 | 7/2005 | Lango et al. | |
| 2009/0006849 A1 | 1/2009 | Gupta et al. | |

FOREIGN PATENT DOCUMENTS

WO 02/41187 A1 5/2002

\* cited by examiner

*Primary Examiner* — Mohammad Ali
*Assistant Examiner* — Syed Hasan
(74) *Attorney, Agent, or Firm* — Haynes Beffel & Wolfeld LLP; Ernest J. Beffel, Jr.

(57) ABSTRACT

A cache server is provided in a network for storing Java objects for retrieval by one or multiple application servers. Application server(s) are configured to request an object from the cache server, rather than requesting the Java object directly from a database, so as to reduce processing load on the database and free up database resources. Responsive to a request for a Java object from an application server, e.g., in an HTTP request, the cache server determines if the object is stored in memory and if so, serializes the requested object and sends the serialized object to the requesting server, e.g., in an HTTP response. The requesting server then deserializes the Java object. If the object is not stored in memory, the cache server instantiates the object (typically by requesting the object from the database), serializes the instantiated object and sends it to the requesting server. Cache coherency methods are also provided.

26 Claims, 2 Drawing Sheets

JAVA OBJECT CACHE SERVER FOR DATABASES

BACKGROUND OF THE INVENTION

The present invention generally relates to cache servers and more particularly to cache servers for storing Java objects for databases.

Databases and storage systems are a crucial component of any network system. Databases and storage systems maintain data, code and other information in a retrievable format for use by other entities on the network. In networks having large amounts of user traffic, for example requiring that large numbers of I/O requests be processed, a database can become strained resulting in compromised performance and delay. It is therefore desirable to offload processing responsibility or otherwise reduce the load on the database intelligence so as to maintain, or even increase, database performance and decrease any potential delays associated with excessive traffic.

In networks using the Internet as a means for web-based communication with users, one component of data storage is the storage of Java objects and associated data. For example, in a web-based customer relationship management (CRM) system, Java objects are an important component of the network interface software infrastructure. Similar to conventional data storage systems, database systems that store and serve Java objects and related information are susceptible to problems such as compromised performance and increased latency due to increased traffic related to Java objects. Currently there are no convenient systems or methods for minimizing or removing such problems in databases serving Java objects.

It is therefore desirable to provide systems, methods and apparatus useful for reducing the load on database systems serving Java objects in a network, particularly for a web-based CRM network, and for maintaining coherency of Java objects in the network.

BRIEF SUMMARY OF THE INVENTION

The present invention provides systems, methods and apparatus useful for reducing the load on a database system serving Java objects in a network, particularly for a web-based CRM network. The present invention also provides systems and methods for maintaining coherency of Java objects in the network.

According to the present invention, a cache server is provided in a network for storing Java objects for retrieval by one or multiple application servers. Rather than requesting the Java object directly from a database, the application server(s) are preferably configured to request the object from the cache server so as to reduce processing load on the database and free up database resources. Responsive to a request for a Java object from an application server, e.g., in an HTTP request, the cache server determines if the object is stored in memory and if so, serializes the requested object and sends the serialized object to the requesting server, e.g., in an HTTP response. The requesting server then deserializes the Java object. If the object is not stored in memory, the cache server instantiates the object (typically by requesting the object from the database), serializes the instantiated object and sends it to the requesting server.

The cache server maintains cache coherency, in certain aspects, by invalidating Java objects responsive to commands from application servers, for example, when an application server has modified an object. When the cache server receives an invalidate command or request, the cache server begins a rebuild of the identified Java object. As the object is being rebuilt, the cache server responds to any requests for the object by sending out the old Java object. When the new Java object is built, the cache server replaces the old Java object with the new Java object. In one aspect, an invalidation request for a parent Java object sets a child invalidation time on the Parent Java object, which is used for a subsequent request for the child Java object. If a child object is older than the invalidation time set on the parent then the child Java object is rebuilt also. If any invalidation requests are received for a particular Java object while that Java object is being rebuilt, a flag is set, and the flag is checked after the rebuild to determine whether another rebuild is necessary.

Special update messages are used in certain aspects to keep certain objects up to date without having to rebuild the object after each invalidation request. Update messages are a special type of invalidation message and are particularly useful for objects that are invalidated on many pages and consequently would generate so many invalidation requests that the hit rate for these types of objects would be so low as to negate or reduce the benefit of the cache.

In certain aspects the cache server is configured to automatically purge stale Java objects based on the last time an object was accessed. Purging typically occurs each time a Java object is requested or when the cache server has reached capacity or the number (or size of used memory) of stored objects has exceeded a user-defined threshold.

In certain aspects, components of the network operate, or are configured, such that the cache server is not a single point of failure that would shut down or greatly hinder operation of the network. For example, the cache server can transparently fail from an application server's perspective because each application server is preferably configured to communicate directly with the database to instantiate a requested Java object. An application server periodically retries to retrieve a requested object from the cache server, but if unsuccessful creates the object on its own. In certain aspects, for example, each application server monitors HTTP request time outs by maintaining a pool of cache server communication threads. If a time out occurs, the application server terminates the communication thread and retrieves the object from the database. The maximum number of communication threads and the duration of time outs are preferably user configurable.

According to one aspect of the present invention, a method is provided for providing a Java object from a cache server to a requesting system, the cache server being communicably coupled to a Java object database and one or more requesting systems. The method typically includes receiving a request from a requesting system, the request identifying a Java object, and responsive to the request, determining whether the identified Java object is stored in the cache server. If the identified Java object is stored in the cache server, the method typically includes serializing the identified Java object, and sending the serialized Java object to the requesting system. If the identified Java object is not stored in the cache server, the method typically includes instantiating the identified Java object, serializing the instantiated Java object, and sending the serialized Java object to the requesting system.

According to another aspect of the present invention, a Java object cache server is provided. The cache server is typically communicably coupled to a Java object database and one or more requesting systems. The cache server typically includes a processor, and a memory for storing Java objects. The server is typically configured to receive a request from a requesting system, the request identifying a Java object, and determine whether the identified Java object is stored in the memory. If the identified Java object is stored in memory, the cache server is typically configured to serialize the identified Java object, and send the serialized Java object to the requesting system. If the identified Java object is not stored in memory, the cache server is typically configured to instantiate the identified Java object, serialize the instantiated Java object, and send the serialized Java object to the requesting system.

According to yet another aspect of the present invention, a method of rebuilding a Java object in a Java object cache server is provided. The method typically includes receiving an invalidation request, the invalidation request identifying a first Java object in the cache server, rebuilding the first Java object, and maintaining an original copy of the first Java object in the cache server as the cache server is rebuilding the first Java object, such that the cache server is able to provide the original copy in response to a request for the first Java object as the first Java object is being rebuilt.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
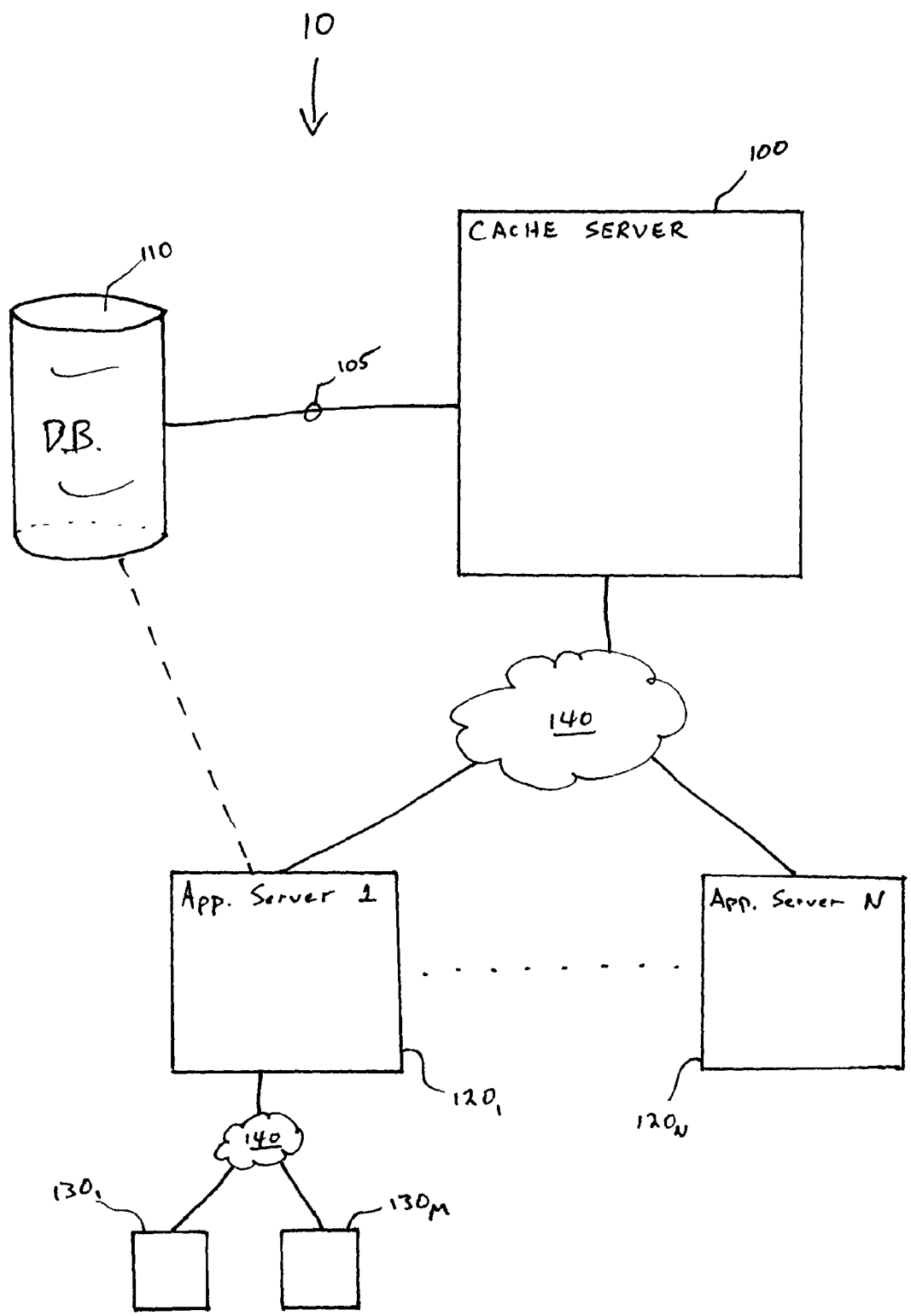
FIG. 1 illustrates a network including a Java object cache server communicably coupled to a Java object database and one or multiple application servers according to one embodiment of the present invention.

FIG. 1 illustrates a network 10 including a Java object cache server 100 communicably coupled to a database system 110 and one or multiple application servers 120 according to one embodiment of the present invention. In network 10, each application server $120_1$ to $120_N$ is coupled to cache server 100 through a network connection. As shown, each application server 120 is coupled to cache server 100 via the Internet 140, although it should be understood that other communication networks such as LAN or WAN may be used, and any number of interconnect media and protocols may be used. It should also be understood that each application server 120 may be communicably coupled to cache server 100 via a different network connection. For example, application server $120_1$ may be coupled via the Internet 140, application server $120_{N-1}$ may be coupled via a direct network link, and application server $120_N$ may be coupled by yet a different network connection. Transfer Control Protocol and Internet Protocol (TCP/IP) are preferred protocols for communicating between application servers 120 and cache server 100, however, it will be apparent to one skilled in the art that other transport protocols may be used to optimize the system depending on the network interconnect used.

Cache server 100 is also communicably coupled to database 110 over communication link 105. Communication link 105 may include a direct network connection or a series of indirect connections, such as for example the Internet. Database system 110 is configured to store Java objects, as well as code, data and other information, for retrieval by cache server 100 and other devices and systems such as application servers 120. As will be described herein, cache server 100 is configured according to the present invention to, inter alia, communicate with application servers 120 and database 110, to store Java objects, to deliver Java objects to requesting application servers 120, to rebuild invalidated Java objects and to retrieve Java objects from database 110.

A plurality of client systems 130 are communicably coupled to application servers 120. For example, as shown, multiple client systems $130_1$ to $130_M$ are coupled to application server $120_1$ over the Internet 140, although other network interconnects may be used. In certain aspects, client systems 130 request from application servers 120 web pages and other content such as code and data that may require Java objects. Client systems 130 also provide data and other information content to application servers 120.

In preferred aspects, network 10 implements a web-based customer relationship management (CRM) system. For example, in one aspect, application servers 120 are configured to implement and execute CRM software applications as well as provide related data, code, forms, web pages and other information to and from client systems 130 and to store to, and retrieve from, database 110 related data, objects and web page content. In preferred aspects, each application server is configured to handle requests for any user/organization. Because it is desirable to be able to add and remove application servers from the server pool at any time for any reason, there is preferably no server affinity for a user and/or organization to a specific application server. In one embodiment, therefore, a piece of hardware (not shown) implementing a load balancing function (e.g., an F5 Big-IP load balancer) is communicably coupled between the application servers 120 and the user systems 130 to distribute requests to the application servers 120. In one aspect, the load balancer uses a least connections algorithm to route user requests to the application servers. Other examples of load balancing algorithms, such as are round robin and observed response time, also can be used. For example, in certain aspects, three consecutive requests from the same user could hit three different application servers, and three requests from different users could hit the same application server. In this manner, cache server 100 is multi-tenant, wherein the cache server handles caching of different objects across disparate users and organizations.

Several elements in the system shown in FIG. 1 include conventional, well-known elements that need not be explained in detail here. For example, each client system 130 could include a desktop personal computer, workstation, laptop, PDA, cell phone, or any WAP-enabled device or any other computing device capable of interfacing directly or indirectly to the Internet or other network connection. Client system 130 typically runs a browsing program, such as Microsoft's Internet Explorer, Netscape Navigator, Opera, or a WAP enabled browser in the case of a cell phone, PDA or other wireless device, or the like, allowing a user (e.g., subscriber of CRM system) of client system 130 to access, process and view information and pages available to it from application server systems $120_1$ to $120_N$ over Internet 140. Each client system 130 also typically includes one or more user interface devices, such as a keyboard, a mouse, touchscreen, pen or the like, for interacting with a graphical user interface (GUI) provided by the browser on a display (e.g., monitor screen, LCD display, etc.), in conjunction with pages, forms and other information provided by server systems $120_1$ to $120_N$ or other servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Each client system 130 and all of its components are operator configurable using applications, such as a browser, including computer code run using a central processing unit such as an Intel Pentium processor or the like. Similarly, each application server 120 and cache server 100, and all of their components, are operator configurable using application(s) including computer code run using a central processing unit such as an Intel Pentium processor or the like, or multiple processor units. Computer code for operating and configuring application servers 120, and cache server 100, to intercommunicate and to process Java objects, web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., from a server system to cache server 100 over the Internet, or from a server to an application server 120 over the Internet, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in, for example, C, C+, HTML, XML, Java, JavaScript, any other scripting language, such as VBScript, or any other markup language or programming language that can be executed on a server or server system.

According to one embodiment, each application server 120 is configured to provide web pages, forms, data and media content to client system 130, and to retrieve related data, objects, code and other information from database 110 and/or cache server 100. Application servers 120 may be located in close proximity to one another (e.g. in a server farm located in a single building or campus), or they may be distributed at locations remote from one another (e.g., one or more servers located in city A and one or more servers located in city B). As used herein, the term "server system" is meant to include one or more logically and/or physically connected servers distributed locally or across one or more geographic locations. Additionally, the term "server" is meant to include a computer system and an associated storage system and database application as is well known in the art. It should also be understood that "server system" and "server" are often used interchangeably herein. For example, although cache server 100 is referred to herein as a single server, it is understood that in certain aspects cache server 100 may embody a distributed server network. Similarly database 110 may embody a distributed database or storage network and associated processing intelligence.

Figure 2:
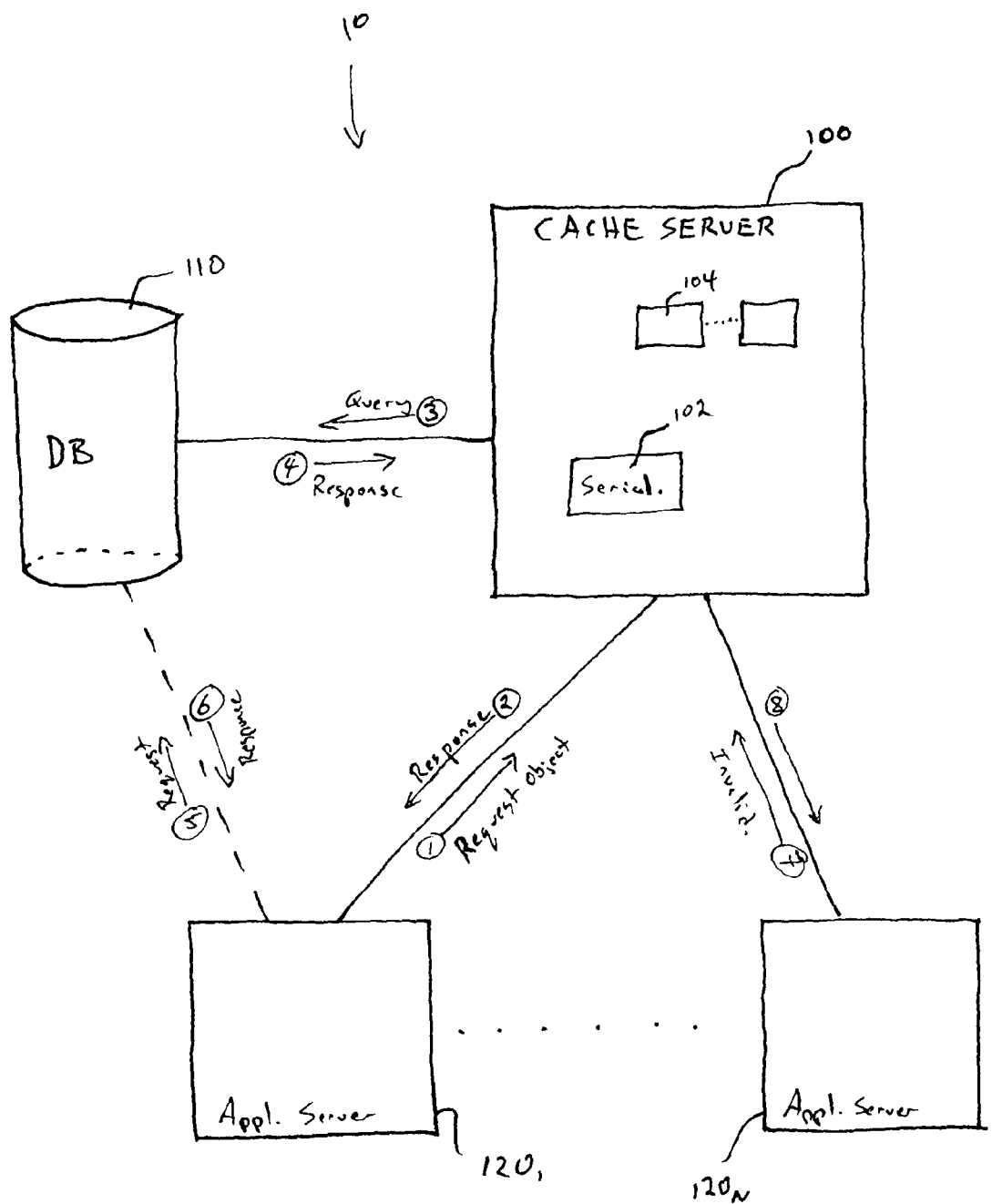
FIG. 2 illustrates messages sent to and from various entities in a network according to various aspects of the present invention.

FIG. 2 illustrates an example of messages sent to and from various entities in network 10 according to various aspects of the present invention. In preferred aspects, application server 120₁ is configured to request a Java object from cache server 100 before attempting to request the object from the database system 110. As shown, application server 120₁ sends a request message 1 addressed to cache server 100. Request 1 includes information identifying a Java object. In preferred aspects, request 1 is an HTTP request, although other types of message formats and protocols may be used. An example of an HTTP request 1 in a CRM based system is "?type=6&id=005z0000000E4Uj&msg=1". Referring to Table 1, below, the values translate as follows: type=6 means "Core", or all the objects needed to display a page (e.g., User object, Organization Object, the User's MRU ("Most Recently Used") object, and the User's Preferences object). Id is the users's id (which is also used as the cache identifier in this example), msg=1 identifies this as a get object message.

TABLE 1

Request Parameters

| HTTP Request values for "msg" | |
| --- | --- |
| MESSAGE_GET | = 1; |
| MESSAGE_INVALIDATE | = 2; |
| MESSAGE_UPDATE | = 3; |
| HTTP Request values for "type" | |
| TYPE_USERINFO | = 1; User Object |
| TYPE_ORGINFO | = 2; Organization Object |
| TYPE_ORGUSERS | = 3; Organization's Users |
| TYPE_USERPREF | = 4; User Preference Object |
| TYPE_USERMRU | = 5; User Sidebar MRU Object |
| TYPE_CORE | = 6; CORE is a shortcut to retrieve User, Org, User Preference, and User Sidebar MRU objects |
| TYPE_PICKLIST | = 7; Organization Picklist |
| TYPE_APIRATECOUNT | = 8; Organization API rate limiter parameter |
| TYPE_ORGMRUS | = 9; Organization's MRUs |

Cache server 100 receives the request 1, and uses the information identifying the Java object to determine whether the identified object is stored in its data structure in memory, e.g., locally on a storage medium or storage subsystem associated with cache server 100. For example, cache server 100 performs a lookup in a table of cached Java objects using the information identifying the object as included in the request 1. Other methods for determining whether an object is stored in cache server 110 will be readily apparent to one skilled in the art.

In one embodiment, if it is determined that the identified Java object is stored on cache server 100, cache server 100 retrieves the object from memory and sends the object to serialization engine 102. Serialization engine 102 is configured to serialize the object, e.g., convert the object to a raw byte stream. Typically serialization engine 102 is implemented in software code executed by a central processing unit as is well known, although a specialized hardware or firmware module may be implemented to serialize objects. For an object to be serialized, the object must implement the Serializable interface, e.g., as is set forth in the Java Specification available from Sun Microsystems, the contents of which are well known to one of skill in the art and which are hereby incorporated by reference for all purposes. For certain information, such as passwords or other sensitive information, it may be desirable to externalize the object. In such cases the object must implement the Externalizable interface as is well known. Generally, the Externalizable interface allows one to specify which fields of an object are serializable.

After the object has been serialized, cache server 100 sends the serialized object to application server 120₁ in a response message 2. Response 2 preferably includes an HTTP response packet. Upon receipt of response 2, application server 120₁ deserializes the object and processes the object as desired. For example, application server may generate a web page using the object and transmit the page to a client system responsive to a previous request for the page that required the identified object from the client system.

If it is determined that the identified object is not stored on cache server 100, cache server 100 instantiates the object and then serializes the object and sends out the serialized object in response 2 as above. To instantiate the identified object, cache server 100 preferably requests the identified object from database 110 by sending a query message 3 to database 110. The query 3 includes sufficient information for database 110 to identify the requested Java object. Database 110 retrieves the object and sends the object to cache server 100 in response 4 for instantiation by cache server 100. If necessary or desirable due to the network configuration, database 110 may serialize the object and send the serialized object to cache server 100. Upon receipt of a serialized object, cache server 100 deserializes and instantiates the object. Cache server 100 may simply forward on the serialized object to requesting application server 120$_1$, e.g., stream from database 110 to application server 120$_1$ using the cache server 100 as an intermediary device. Cache server 100 may concurrently or thereafter instantiate the object. Alternatively, cache server 100 may deserialize, instantiate, re-serialize and send the object to application server 120$_1$. If the object received from database 110 is not serialized, cache server 100 instantiates the object, serializes the instantiated object and sends out the serialized object to application server 120$_1$ in response 2 as above. Typically, upon instantiating an object received from database 110, cache server 100 stores the object to memory, i.e., adds it to its data structure.

In one embodiment, each application server 120 is configured to monitor request time outs, e.g., HTTP request time outs, by maintaining its own pool of cache server communication threads. If a response from cache server 100 is not timely received, each application server 120 is configured to periodically retry to retrieve an object from cache server 100, e.g., sending additional requests 1. If however, such attempts are unsuccessful after a certain period of time, or certain number of tries, the application server requests the Java object from database 110 by sending a database request 5 to database 110. Database request 5 preferably includes sufficient information to identify the requested object. Database 110 responds by sending the object in a response message 6. If necessary or desirable, database 110 serializes the object and sends the serialized object to the requesting application server. For each application server 120, the maximum number of cache server communication threads and the HTTP request time out period(s) are preferably user configurable. In this manner, the cache server 100 is not a single point of failure in network 10, meaning that if cache server 100 fails or is down for any reason, each application server 120 is able to instantiate the requested object itself by contacting the database system 110 directly.

Cache coherency is maintained, according to one embodiment, by invalidating Java objects responsive to invalidation requests 7 received from application servers 120, or database 110, e.g., after an object has been modified by an entity other than cache server 100. An invalidation request is preferably an HTTP message, although other message formats and protocols may be used. An example of an HTTP invalidation request is "?type=1&id=005z0000000E4Uj&msg=2". Referring to Table 1, above, the values translate as follows: type=1 means "User" or the user object, id is the user's id (which is used as the cache identifier in this example), msg=2 identifies this as an invalidation message. An invalidation request 7 preferably triggers an immediate rebuild of the Java object(s) identified in the invalidation request. If an object is being rebuilt, and subsequent invalidation request(s) are received during the rebuild identifying the object being rebuilt, a flag is set telling the cache server that the object needs to be rebuilt again. When rebuilding is completed, the flag is checked to determine if another rebuild is necessary. The process continues as long as invalidation requests continue to be received during a rebuild of the object.

As the cache server is rebuilding an object, if a request 1 identifying that object is received, the cache server 100 sends out a copy (e.g., serialized) of the original object in its state before being rebuilt. In preferred aspects, therefore, cache server 100 maintains a copy 104 of the original, pre-rebuild Java object in its data structure. In this manner the impact of rebuilds on the requesting application server pool is advantageously minimized, because the application pool is able to obtain a pre-rebuild copy 104 of the requested object as the object is being rebuilt by cache server 100. When the rebuild is complete, cache server replaces the pre-rebuild copy 104 with the rebuilt object in the data structure. For example, the cache is locked and the current Java object is replaced with the newly built Java object.

In one embodiment, an invalidation request identifying a parent object sets a child invalidation time on the parent Java object that is used by a subsequent request for a child Java object. If the child object is older than the invalidation time set on the parent object, the child object will be rebuilt. Any invalidation requests received during the rebuild of the child object that would affect the child are flagged, as above. As an example, for specific Organization properties and settings changes in a CRM system, a rebuild of the child object (e.g., TYPE_ORGUSERS and TYPE_ORGMRUS from Table 1) is forced the next time it is requested.

As an example of a rebuild of an object in a CRM system will now be given with reference to the Organization Object (OrgInfo) of Table 1. The Organization Object (OrgInfo) may contain the organization's language, timezone, business hours, and currency code, for example. The cache server 100 loads the OrgInfo once, and then shares it across the organization's users. When an administrator changes the organization's language, an invalidation message is sent to the cache server 100 to reload the OrgInfo. Cache server 100 receives the invalidation message and starts rebuilding the OrgInfo. At the same time, the old OrgInfo is still being served while the new one is being rebuilt. When the new OrgInfo is built, cache server 100 throws away the old one and starts serving out the new OrgInfo.

In the event that the language, time zone, business hours, and currency code are all updated at around the same time by different administrators, cache server 100 handles all the concurrent invalidation requests with the minimal amount of work. Upon receiving the first invalidation request for a language change, cache server 100 rebuilds the OrgInfo as described above. If cache server 100 receives a second invalidation message for a time zone change for the same organization while it is handling the first invalidation message, it sets a flag indicating that the OrgInfo needs to be rebuilt as soon as the current rebuild is complete. If cache server 100 receives additional invalidation messages while the "rebuild again" flag is set, it ignores these additional invalidation messages because cache server 100 already knows to rebuild the OrgInfo object. Once the second rebuild is complete it throws away the old object and starts serving out the newly rebuilt OrgInfo object.

For certain objects, special update messages are preferably used to keep those objects up to date without having to rebuild the object after each invalidation request. Update messages are a special type of invalidation message and are particularly useful for objects that are invalidated on many pages and consequently would generate so many invalidation requests that the hit rate for these types of objects would be so low as to negate or reduce the benefit of the cache. As an example, in a CRM system, User preferences and sidebar MRU objects are such objects for which update messages are particularly useful. For example, in these and similar objects, it is typically known exactly what changes were made, the object is typically synchronized on the database level, e.g., the database is always up-to-date, and the changes are typically very small, usually including a name-value pair. The use of update message is also very fast as they preferably do not return any data except for an HTTP response code (e.g., 200 OK).

In operation, the cache server takes the parameters of an update message and modifies the cached version of the identified object, e.g., MRU object. This mechanism also allows the system to ignore the order of execution. For example, the MRU is loaded in the beginning of every request. However, at that point, the MRU contains the values valid for the previous request. The rest of the request can (and most likely will) change the value of the MRU. With such "lazy" update of the MRU, the update is applied later in the request to both the local and the remote versions of the MRU. Doing so advantageously saves cache-server calls to invalidate and reload the MRU.

In another embodiment, the cache server is also configured to automatically purge stale Java objects. A purging operation preferably occurs each time a request for an object is received, e.g., each time a request message 1 is received. In preferred aspects, purging of Java objects is based on the last time an object was accessed. For example, if a Java object has not been accessed within a specified time (i.e., last access interval time), it is removed from the data structure of the cache server 100. The number of objects cached, or the memory space allowed, and the last access interval are preferably user configurable, e.g., by a network administrator using a remote computer system or a direct attached computer system.

In yet another embodiment, serialized objects are preferably stored on disk, for example on CD, DVD, hard drive, RAM disk, etc. Storing serialized objects on disk advantageously speeds up start-up when the cache server is brought back on line (for example after a release or downtime). When a cache server is started the cache is typically empty so every request requires a round trip to the database. With serialized objects stored on disk, a request for an object preferably prompts the cache server to first look on disk. Additionally, upon start-up the cache server preferably loads all serialized objects saved to disk. When the cache server starts up again, it is conceivable (and likely) that some of the objects on the disk are invalid. This can occur when the cache server is unavailable or down when an invalidation request is made from an application server. Thus, in yet another embodiment, each cacheable object includes a version number that is updated (for example, increased by 1) every time the object is updated in the database. Upon serializing an object from the disk, the version number of the stored object is compared to the version number of the object on the database by making a fast and simple call to the database. Alternatively, only the version number is retrieved from the disk for comparison before serializing the object from disk. If the version numbers do not match, the object on disk is never serialized to, or stored to, the cache server memory, and the next request for the object is considered a cache miss. By making this call to the database, the cache server advantageously avoids reloading objects that are still valid while maintaining data integrity for objects that have been invalidated during the cache server downtime.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing an object from a cache server to a requesting system, the method comprising the steps, implemented in a cache server, of:
   receiving a request from a requesting system, the request identifying an object;
   responsive to said request, determining whether the identified object is stored in the cache server; and
   if the identified object is stored in the cache server:
      serializing the identified object into a byte stream to form a serialized object; and
      sending the serialized object to the requesting system; and
   if the identified object is not stored in the cache server instantiating the identified object;
      serializing the instantiated Java object into a byte stream to form a serialized object; and
      sending the serialized Java object to the requesting system; and
   receiving an invalidation request from a requesting system to invalidate an object on the cache server and identifying an object to rebuild; and
   rebuilding the identified object responsive to receiving the invalidation request.

2. The method of claim 1, wherein instantiating includes:
   requesting the identified object from the object database; and
   receiving the requested object from the object database.

3. The method of claim 1, further including storing the instantiated Java-object in the cache server.

4. The method of claim 1, wherein the received request is an HTTP request, and wherein sending the serialized object includes sending the object in an HTTP response to the requesting system.

5. The method of claim 1, further including automatically removing, from the cache server, objects that have not been accessed within a specified access interval.

6. The method of claim 1, further including automatically removing, from the cache server, one or more Java-objects when it is determined that a specified number of objects are stored in the cache server.

7. The method of claim 1, further including:
   receiving an update message from a requesting system, said update message identifying a second object to update; and
   updating the second identified object responsive to receiving the update message.

8. The method of claim 1, further including storing the serialized object to a disk.

9. The method of claim 1, further including storing the serialized object to a disk drive.

10. The method of claim 1, wherein the object is a Java object.

11. An object cache server communicably coupled to an object database and one or more requesting systems, the cache server comprising:
   a processor; and
   a memory for storing objects,
   wherein the server is configured to:
      receive a request from a requesting system, said request identifying an object;

determine whether the identified object is stored in the memory; and if the identified object is stored in memory:
  serialize the identified object into a byte stream to form a serialized object; and
  send the serialized object to the requesting system; and if the identified object is not stored in memory:
  instantiate the identified object;
  serialize the instantiated object into a byte stream to form a serialized object; and
  send the serialized object to the requesting system; and wherein the server is further configured to rebuild a object stored in the memory in response to an invalidation request from a system to invalidate an object on the server, said invalidation request identifying the object to be rebuilt.

12. The server of claim 11, wherein the server is further configured to automatically remove, from the memory, objects that have not been accessed within a specified access interval.

13. The server of claim 11, wherein the server is further configured to automatically remove objects from the memory when it is determined that a specified number of objects are stored in the memory.

14. The server of claim 11, wherein the server is further configured to update an object stored in the memory in response to an update message from a system, said update message identifying the object to be updated.

15. The server of claim 11, further including a disk drive, wherein the server is further configured to store the serialized object to the disk drive.

16. The system of claim 15, wherein the serialized object stored to the disk drive includes a version number, wherein objects stored in the database each include a version number, and wherein upon a start-up of the cache server, the cache server retrieves the version number of the serialized object from the disk drive, requests the version number of the object from the database and compares the version number of the object from the disk drive with the version number from the database.

17. A method of rebuilding an object in an object cache server, comprising the steps, implemented in the cache server, of:
  receiving an invalidation request, said invalidation request to invalidate an object on the cache server and identifying a first object in the cache server to be rebuilt;
  rebuilding the first object; and
  maintaining an original copy of the first object in the cache server as the cache server is rebuilding the first object, such that the cache server is able to provide the original copy in response to a request for the first object as the first object is being rebuilt.

18. The method of claim 17, further comprising sending the original copy of the first object to a requesting system in response to a request for the first object received while the first object is being rebuilt.

19. The method of claim 17, further comprising: receiving a second invalidation request identifying the first object, said second invalidation request being received while the first object is being rebuilt; and processing the second invalidation request after the first object has been rebuilt.

20. The method of claim 17, further comprising:
  receiving a plurality of second invalidation requests identifying the first object while the first object is being rebuilt;
  setting a flag in response to each second invalidation request; and
  processing each second invalidation request in the order received.

21. The method of claim 20, wherein for each second invalidation request, processing includes:
  rebuilding the object according to the second invalidation request;
  maintaining a copy of the object in the cache server as it exists before being rebuilt; and thereafter replacing the object with the rebuilt object.

22. The method of claim 17, further comprising after rebuilding the first object, replacing the original object in the cache server with the rebuilt object.

23. The method of claim 17, wherein the first object is a Java object.

24. The method of claim 17, further comprising maintaining an original copy of the first object in the cache server as the cache server is rebuilding the first object, such that the cache server is able to provide the original copy in response to a request for the first object as the first object is being rebuilt.

25. A method of providing an object from a cache server to a requesting system, the cache server being communicably coupled to an object database and one or more requesting systems, the method comprising the steps, implemented in a cache server, of:
  receiving a request from a requesting system, the request identifying an object;
  responsive to said request, determining whether the identified object is stored in the cache server; and
  if the identified object is stored in the cache server:
    sending the object to the requesting system; and
  if the identified object is not stored in the cache server:
    instantiating the identified object; and
    sending the instantiated object to the requesting system; and
  receiving an invalidation request from a requesting system to invalidate an object on the cache server and identifying an object to rebuild; and
  rebuilding the identified object responsive to receiving the invalidation request.

26. The method of claim 25, wherein the object is a Java object.

* * * * *